Patented Oct. 4, 1938

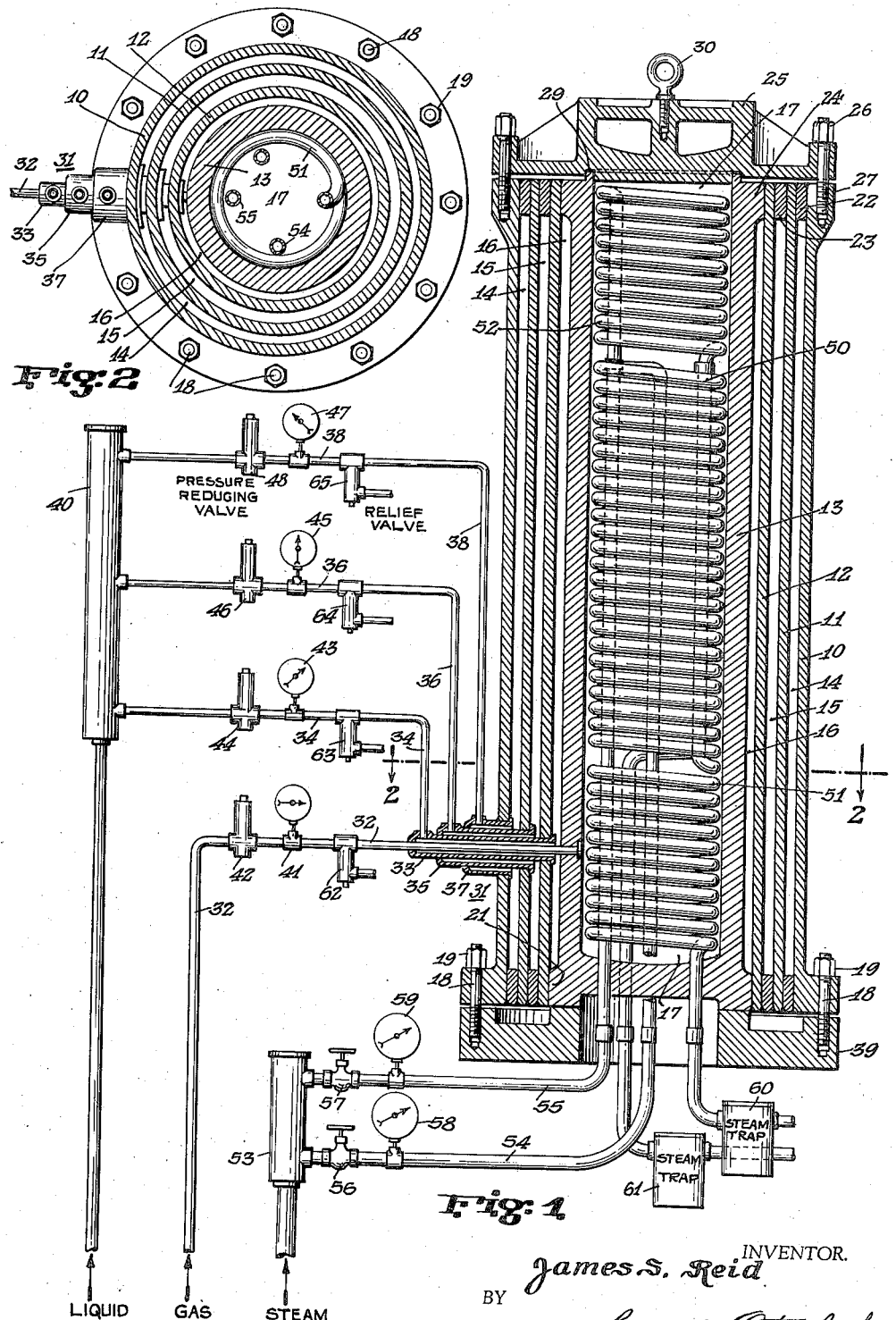

2,131,753

UNITED STATES PATENT OFFICE 2,131,753

MULTIWALL AUTOCLAVE

James S. Reid, Cleveland, Ohio, assignor to Rubatex Products, Inc., New York, N. Y., a corporation of Delaware Application June 4, 1936, Serial No. 83,501

2 Claims. (Cl. 23—290)

This invention relates to autoclaves used in gassing and simultaneous heating of materials.

In the manufacture of gas expanded rubber, the components are mixed to form a dough which is inserted in an autoclave. An inert gas at a pressure of the order of two hundred atmospheres or over is forced into the autoclave chamber for adsorption by the rubber dough. In the process for manufacturing gas expanded rubber as disclosed in the Denton U. S. Patent #1,905,269 and in the application Serial No. 717,550 filed Mar. 27, 1934 and assigned to the same assignee as my present invention, simultaneous heating of the rubber dough is effected during the gassing stage. Simultaneous heating is carried on to partially vulcanize the dough so that upon removal from the autoclave, the adsorbed inert gas will be retained by the rubber as an individual cellular structure.

Higher gaseous pressures than two hundred and fifty atmospheres are desirable for more homogeneous and rapid adsorption of the gas by the rubber dough. Moreover, autoclaves constructed in accordance with conventional design for relatively high pressures, such as five hundred atmospheres and over, for experimental work, are very costly as well as dangerous. A small leak or break in prior autoclaves may result in an explosion due to the rapid escape of the confined gases.

In accordance with my present invention, I contemplate an autoclave built up of a plurality of concentric chambers having successively diminishing pressures applied thereto. The effective pressure upon any one wall of the autoclave is the difference in the pressures on opposite sides of the wall. By maintaining the differential wall pressure at a relatively low value, for example 2000 pounds per square inch, the maximum pressure within the autoclave chamber may be readily made a multiple thereof by using a corresponding number of concentric chambers.

For example, if a chamber pressure of 8000 pounds is required and the chamber walls are designed for 2000 pounds per square inch differential pressure, the main central chamber and three concentric pressure chambers are required to successively reduce in 2000 pound steps the internal 8000 pound per square inch pressure to atmospheric pressure outside the autoclave.

The chamber walls of the autoclave of my present invention are designed to withstand the differential pressure, and no wall is required to withstand any extremely high pressure. Thus the inner wall containing the 8000 pound per square inch pressure is reinforced on its opposite surface by a back pressure of 6000 pounds per square inch. It will be evident that other differential wall pressures than herein disclosed may be used and that the principle of applying concentric pressure chambers results in a relatively light weight, economical and efficient autoclave structure.

Although gases may be used in the reinforcing concentric chambers, I provide the concentric chamber pressure by hydraulic means to avoid any danger of explosion of the autoclave. The explosive action of a wholly gaseous autoclave resides in the great expandibility of the gases. By employing liquid pressures in the concentric chambers, the substantially incompressible liquid would necessitate no materially greater volume upon any pressure change when a leak or break occurs.

The autoclave of my present invention utilizing hydraulic reinforcing pressure chambers would merely collapse or "cave-in" instead of explode if a fault should occur.

The heating of the autoclave chamber is generally accomplished by a continuous steam coil wound adjacent the inner chamber of the wall. I have found that unsatisfactory heating results with such an arrangement since the chamber end sections are not sufficiently heated as compared to the central section.

The temperature gradient at the end sections is greater than the intermediate section of the chamber and I have found that heating these end sections to a greater extent than the intermediate section results in uniform and homogeneous heating of the rubber dough charge.

It is accordingly an object of my present invention to provide a novel autoclave for very high pressures which is relatively inexpensive and is non-explosive.

Another object of my invention is to provide a novel autoclave for very high pressures that is relatively light in weight.

A further object of my invention is to provide a novel autoclave having means for uniform chamber heating.

These and other objects of my invention will become apparent in the following description taken in connection with the drawing, in which:

Figure 1 is a cross-sectional illustration of a preferred embodiment of a multi-chamber autoclave.

Figure 2 is a cross-sectional view taken along 2—2 of Figure 1, transverse of the autoclave.

The autoclave is illustrated vertically in Figure

1. However, in many practical installations, a horizontal arrangement of the autoclave is preferable for permitting charging with rubber dough.

The autoclave is illustrated with four concentric steel cylindrical shells 10, 11, 12 and 13. These shells form corresponding annular chambers 14, 15 and 16. The central or gassing chamber 17 of the autoclave is made of sufficient diameter and volume to encase the maximum charge of rubber dough. The central cylindrical shell 13 is preferably made thicker and stronger than the other shells.

The autoclave is mounted on a base 39 which is bolted to the flange 18 extending from the base of outer shell 10 by stay-bolts 19. Circular rims 20 and 21 spaced between the bottom ends of shells 10, 11 and 12 maintain them properly spaced. The joints between the rims 20 and 21 and the shells are welded to insure a perfect pressure seal for the chambers 14 and 15. The central shell 13 has a flange 21' at its bottom end which is welded with the adjacent shell 12 end to form annular pressure chamber 16.

The top end of the autoclave contains the circular rims 22 and 23 corresponding to the rims 20 and 21 for sealing the corresponding end of the chambers 14 and 15. A flange 24 at the top end of the inner shell 13 closes the corresponding end of the chamber 16. The annular chambers 14, 15 and 16 are sealed to retain the high pressures to be described hereinafter.

A cover 25 is fitted at the top end of the autoclave and is fixed into position thereon between stay-bolts 26 set into flange 27 at the top end of the outer shell 10. An eye-bolt 30 is attached centrally to the cover 25 to permit removal from position by a crane or other power operated device. An annular projection 28 at the top end of the inner shell 13 is provided to coact with a corresponding annular recess in the cover plate 25 together with a gasket 29 for rendering the inner chamber 17 gas tight at the high pressure it is subjected to.

A series of concentric piping 31 is arranged at one portion of the autoclave to communicate with the internal chambers for maintaining them at suitable pressures. A pipe 32 communicates directly to the inner chamber 17. An inert gas at the necessary high pressure is passed through pipe 32 to the inner gassing chamber 17.

A concentric tube 33 connects hydraulic pipe line 34 to the annular chamber 16; a further concentric tube 35 connects hydraulic pipe line 36 to the annular chamber 15; and the outer concentric tube 37 connects the hydraulic pipe line 38 to the annular chamber 14. Although I have illustrated a series of concentric tubes to communicate gas and hydraulic pressures to the plurality of chambers, it will be evident to those skilled in the art that other forms for communicating these pressures to the chambers are feasible and need not be grouped into a concentric arrangement.

The cross-sectional view (Figure 2) illustrates the concentric annular chambers and the communication thereto of the pipe lines by the concentric tubes. The inner ends of the concentric tubes 33, 35 and 37 have flanges which are welded to the corresponding shells to render them pressure tight. All the metallic joints which make up the autoclave are preferably welded or otherwise suitably sealed to insure against leaks due to the high pressures they are subjected to.

The annular chambers 14, 15 and 16 are subjected to successively higher hydraulic pressures. Liquid is introduced to the header 40 under hydraulic pressure by a pipe line from a suitable source not shown. The pipe lines 34, 36 and 38 are connected to the hydraulic header 40 through corresponding pressure reducing valves 44, 46 and 48. Corresponding pressure gauges 43, 45 and 47 are used on the pipe lines to indicate the suitable differential pressures which the annular chambers are subjected to.

An inert gas such as nitrogen is generally used for gassing the rubber dough. The gas is fed from a suitable compressor to the chamber 17 through pipe line 32. A pressure gauge 41 and pressure reducing valve 42 are inserted in the pipe line 32.

The heating arrangement within the autoclave is illustrated with steam coils arranged along the inner wall of the shell 13. The steam coils are arranged in two sections, namely a central section 50 and the outer sections 51—52 which are interconnected in series.

Steam is applied to the steam main 53 from which the steam pipes 54 and 55 are tapped to supply the corresponding steam coil sections 50 and 51—52. Corresponding pressure control valves 56 and 57 are inserted in the steam lines together with pressure gauges 58 and 59. A steam trap 60 and 61 is connected to the ends of the steam coil sections. The inlet and outlet pipes for the steam coil sections are sealed at the portions where they pass through the inner shell 13 to prevent any leak due to the high gaseous pressure within the chamber 17.

The central steam coil section 50 is maintained at a lower steam pressure than the end section steam coils 51—52. The higher steam pressures at the end sections will compensate for the higher temperature gradient normally at these zones to maintain a more uniform heating or temperature gradient throughout the whole gassing chamber 17. The differential steam pressures as indicated by gauges 58 and 59 will be determined for a particular autoclave and by the design of the relative size of the steam coil sections.

The procedure for gassing the autoclave is preferably as follows: The hydraulic pressures in the annular chambers 14, 15 and 16 are introduced simultaneously together with the inert gas in the chamber 17. Although I have illustrated three annular chambers about the central gassing chamber, it is to be understood that this is by example only and more or less annular chambers are feasible. The differential pressures between the chambers 14 to 17 are dependent upon the particular design of the autoclave.

These differential pressures may be the same between each successive chamber or may vary in accordance with the design of the successive shells. The shells may be progressively thicker or stronger from the outer shell to the inner one or vice versa. In the following example I shall for simplicity refer to equal differential chamber pressures of 2000 pounds per square inch and use a central chamber pressure of 8000 pounds per square inch.

When chamber 17 is subjected to a gaseous pressure of 8000 pounds per square inch, the pressure gauge 41 will indicate this pressure. The pressure of the first annular chamber 16 is adjusted to 6000 pounds as indicated by gauge 47; the next chamber 15 is adjusted to 4000 pounds as indicated by gauge 45; and the chamber 14, to a pressure of 2000 pounds as indicated by gauge 43. It will be evident that no shell is subjected to a resultant pressure of more than 2000 pounds per square inch.

The pressure reducing valves 42, 44, 46 and 48 are preferably of the automatic type which once adjusted will predetermine the pressure in their respective lines 32, 34, 36 and 38 irrespective of their input pressures. Such gauges are well known in the art and are merely diagrammatically illustrated.

The heating within the gassing chamber 17 may tend to increase the pressure in the chambers. Relief valves 62 to 65 are preferably attached to the input pipe lines of these chambers to avoid excessive pressure increase or pressure unbalance between the chambers.

Hydraulic pressure supplied to chambers 14, 15 and 16 will minimize the danger of explosion of the high pressure autoclave. Since the liquid is substantially incompressible, a leak will not require tremendous volume increase as do expandible gases, but merely gradually reduce the chamber pressure during the leak. The central shell 13 is preferably made stronger than the other shells even though it is designed for a 2000 pound differential since it contains a gas and is directly subjected to the heating coils and mechanical jars due to insertion and removal of the rubber dough charging. Another advantage of the hydraulic pressure in the annular chambers is the relatively less expensive apparatus required to produce corresponding high pressures in the chambers than gas compression machinery.

It is to be understood that the pressure reducing valves 42, 44, 46 and 48 are adjusted to automatically produce the requisite pressures in the autoclave chambers. Any tendency for one or more chambers to exceed the predetermined pressure will operate the correspondingly preset relief valves 62 to 65 to maintain the proper pressures. The pressure settings of the automatically functioning pressure reducing valves 42, 44, 46 and 48 may be changed in a manner well known in the art for different operating pressures for the autoclave. For a given setting, the hydraulic and gas pressures are admitted simultaneously into the chambers to maintain the predetermined pressure differences between the plurality of shells of the autoclave.

I claim:

1. In an autoclave, a central high pressure gas chamber, a removable gas-tight cover for said chamber; a plurality of spaced shells concentric about said chamber forming corresponding annular chambers; said plurality of spaced shells containing liquid under lower pressure than the gas in the central high pressure gas chamber, means for automatically maintaining constant liquid pressures in said concentric annular chambers, said constant pressures being individually less than the pressure in said central high pressure gas chamber, said constant pressures being greatest in the innermost concentric chamber and least in the outermost concentric chamber, said means comprising individual pipe lines connected to each of said chambers, means for generating constant pressures in said annular chambers through the pipe lines including a hydraulic feeder for supplying liquid under pressure to said annular chambers, an automatic pressure reducing valve in each pipe line for reducing the pressure from said feeder to predetermined constant values, a relief valve in said pipe lines for maintaining said predetermined annular chamber pressures, means for maintaining a predetermined gaseous pressure in said central high pressure gas chamber; means for maintaining said central chamber substantially uniformly heated comprising a central helical steam coil, end section helical steam coils and independent means for controlling the heating by said steam coils.

2. In a high pressure device, a central cylindrical high pressure gas chamber, a removable gas-tight cover for said chamber; a plurality of spaced shells concentric about said chamber, said shells being sealed at their ends to form corresponding air-tight chambers and being substantially coextensive with said chamber; said plurality of spaced shells containing liquid under lower pressure than the gas in the central high pressure gas chamber, means for automatically maintaining constant liquid pressures in said concentric annular chambers, said constant pressures being individually less than the pressure in said central high pressure gas chamber, said constant pressures being greatest in the innermost concentric chamber and least in the outermost concentric chamber, said means comprising individual pipe lines connected to each of said chambers through concentric connection joints, means for simultaneously generating predetermined liquid hydraulic pressures in said annular chambers through the pipe lines including a hydraulic feeder for supplying liquid under pressure to said annular chambers, an automatic pressure reducing valve in each pipe line for reducing the pressure from said feeder to predetermined values, a relief valve in said pipe lines for maintaining said predetermined annular chamber pressures, means for maintaining a predetermined gaseous pressure in said central high pressure gas chamber; means for maintaining said central chamber substantially uniformly heated comprising a central helical steam coil, end section helical steam coils and independent means for controlling the heating by said steam coils.

JAMES S. REID.